United States Patent [19]

Varreng

[11] Patent Number: 5,206,780
[45] Date of Patent: Apr. 27, 1993

[54] CABLE TERMINATION

[75] Inventor: Jan Varreng, Oslo, Norway

[73] Assignee: Alcatel STK A/S, Oslo, Norway

[21] Appl. No.: 496,433

[22] Filed: Mar. 19, 1990

[30] Foreign Application Priority Data

Mar. 20, 1989 [NO] Norway .................................. 891198

[51] Int. Cl.$^5$ ............................................. H02H 9/06
[52] U.S. Cl. ...................................... 361/117; 361/56; 361/91
[58] Field of Search ................ 361/120, 117, 56, 111, 361/91, 127

[56] References Cited

U.S. PATENT DOCUMENTS

| | | | |
|---|---|---|---|
| 3,581,154 | 5/1931 | Willox | 361/117 |
| 3,692,922 | 9/1972 | Sugimoto et al. | 174/73.1 |
| 3,796,821 | 3/1974 | Lusk | 174/73 R |
| 3,896,480 | 7/1975 | Harnden, Jr. | 357/80 |
| 4,153,921 | 5/1979 | Kresge et al. | 361/40 |
| 4,198,613 | 4/1980 | Whitley | 333/181 |
| 4,424,547 | 1/1984 | Titus et al. | 361/127 |
| 4,513,338 | 4/1985 | Goodall et al. | 361/1 |
| 4,825,188 | 4/1989 | Parrand et al. | 338/21 |

FOREIGN PATENT DOCUMENTS

| | | |
|---|---|---|
| 0233022 | 8/1987 | European Pat. Off. |
| 0281945 | 9/1988 | European Pat. Off. |
| 1329635 | 9/1973 | United Kingdom |

Primary Examiner—Steven L. Stephan
Assistant Examiner—Ben M. Davidson
Attorney, Agent, or Firm—Brunell & May

[57] ABSTRACT

The invention relates to high voltage surge arrestors which are installed in parallel with an electric apparatus to be protected from excessive high voltages, such as a high voltage power cable or a transformer. The arrestor consists of one or more annular bodies (9,19,32), through the hollow of which a high voltage conductor (3,31) is terminated. The arrestor may also be used with penetrators and transformer bushings.

7 Claims, 3 Drawing Sheets

CABLE TERMINATION

TECHNICAL FIELD

The present invention relates to high voltage surge arrestors which are installed in parallel with an electric apparatus to be protected from excessive high voltages, such as a high voltage power cable or a transformer.

BACKGROUND

The simplest form of protecting device is a spark gap arranged in parallel between earth and the high voltage terminal. With newer techniques the open spark gap device has been substituted by voltage arrestors made of unlinear material such as zinc oxide (ZnO). An example of such arrestors are described in ASEA data sheet LB 25.1 of 1. Dec. 1984, 'ZnO—Ventilavledare typ XBE'. These known surge arrestors consist of a number of cylindrical ZnO blocks which are stacked one upon the other within an insulating cover. The ends of the stack are interconnected between earth and the high voltage terminal, with one end as close as possible to said terminal.

DISCLOSURE OF INVENTION

The object of the present invention is to simplify and improve surge arrestors for electric apparatus.

In accordance with one of the main features of the invention, the arrestor is formed of one or more annular bodies surrounding a high voltage conductor. With a surge arrestor according to the invention the installation of high voltage electric apparatus such as power cables, will be greatly simplified. The arrestor is designed to accomodate a prepared cable end so as to provide a combined end terminal and surge arrestor. The design leads to cheaper cable installations as well as enhanced protection due to the compact construction.

BRIEF DESCRIPTION OF DRAWINGS

Above mentioned and other features and objects of the present invention will clearly appear from the following detailed description of three embodiments of the invention taken in conjunction with the drawings.

In FIG. 1 is schematically illustrated a power cable 1 having a number of armour of shielding elements (not shown) connected to an earthed base plate 2. The cable has a conductor 3 which is compressed or welded to a connector 4. The cable conductor 3 is provided with a layer of insulation material 5 and an outer semiconductor 6. A voltage stress relief device 7 is installed on the prepared cable end. The stress relief device 7 may take many forms. In FIG. 1 it has the form of a layer of stress relieving material which is linear or nonlinear, whereas in FIG. 2 it is based on the principles of the well known stress relief cone 8. Annular elements 9 of nonlinear material constituting the main surge arresting components are placed around the stress relief device 7. The annular element 9 are compressed between two metal discs 10 and 11 by means of a spring 12. The spring also ensures good electrical contact between the top annulus and a high voltage terminal 13, and between the base annulus and a earthed base plate 2. Contact between the connector 4 and the high voltage terminal 13 may be achieved by tightening a top nut 14 so as to press the conical contact surfaces of these two components together. The surge arrestor assembly 9 is enclosed within an insulator 15 which can be made of any organic or inorganic insulator material. The assembly may be designed to fill all highly stressed cavities, or said cavities may alternatively be filled with insulating fluid or gas.

FIG. 2 shows a surge arrestor where the stress relief device 17 is based on principles than that of FIG. 1. Other components (19,20,21,22), including the annular rings 19, which are similar to those of FIG. 1, are fitted to the device 17 and the stress cone 8.

In FIG. 3 is illustrated an alternative voltage surge arrestor 30 in which a conductor 31 is terminated through a unlinear device 32 and a tightly enclosing sleeve 33 of insulating material such as silicon rubber or EPR rubber. The device 32 may be made in one piece as shown or it may consist of a number of annular rings similar to the rings 9 and 19. As an alternative the nonlinear device 32 may be given a form corresponding to a combination of the device 32 and the sleeve 33. In that case the outer surface of the combined nonlinear device should preferably to covered with a layer of insulation material such as silicon rubber. The end portions 34, 35 of the nonlinear device 32 are in direct contact with the terminals 2 and 13. The other components of FIG. 3 correspond to similar components in FIGS. 1 and 2.

Figure 1:
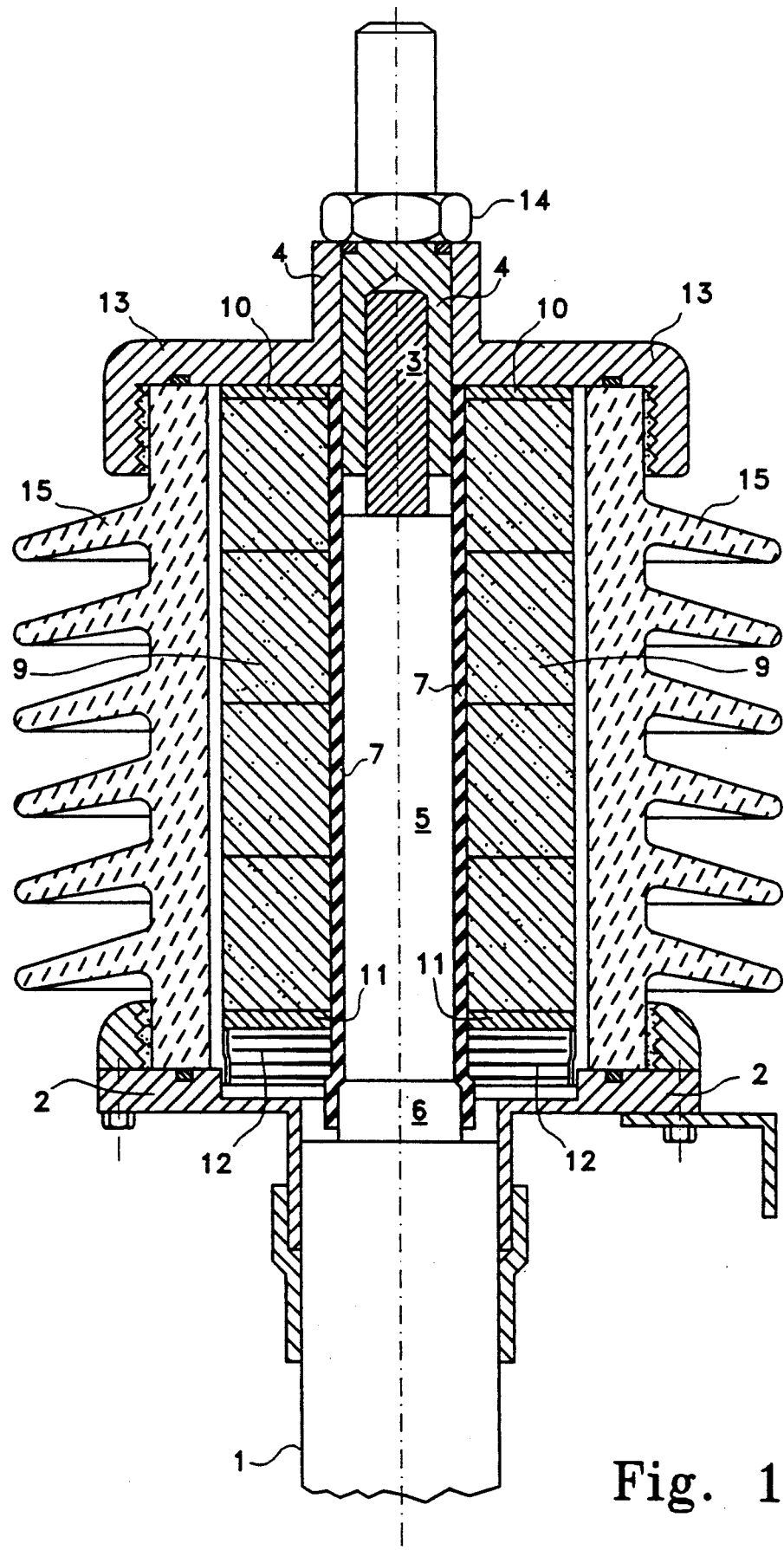
FIG. 1 illustrates a prepared end of a power cable provided with a layer of voltage stress material over which is installed a first embodiment of a surge arrestor assembly enclosed within an insulator.
Figure 2:
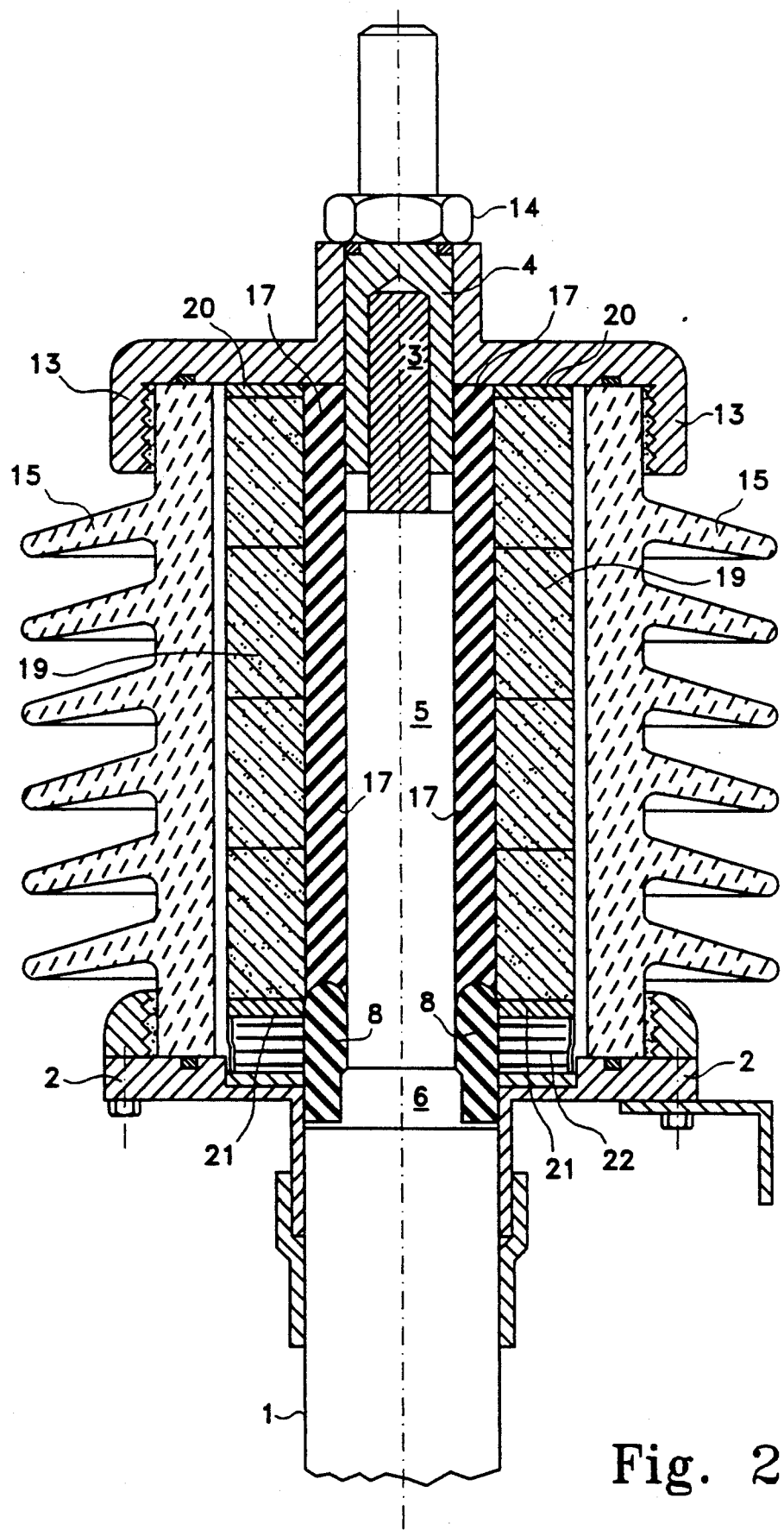
FIG. 2 illustrates a prepared end of a power cable provided with a stress relief cone and a second embodiment of a surge arrestor assembly.
Figure 3:
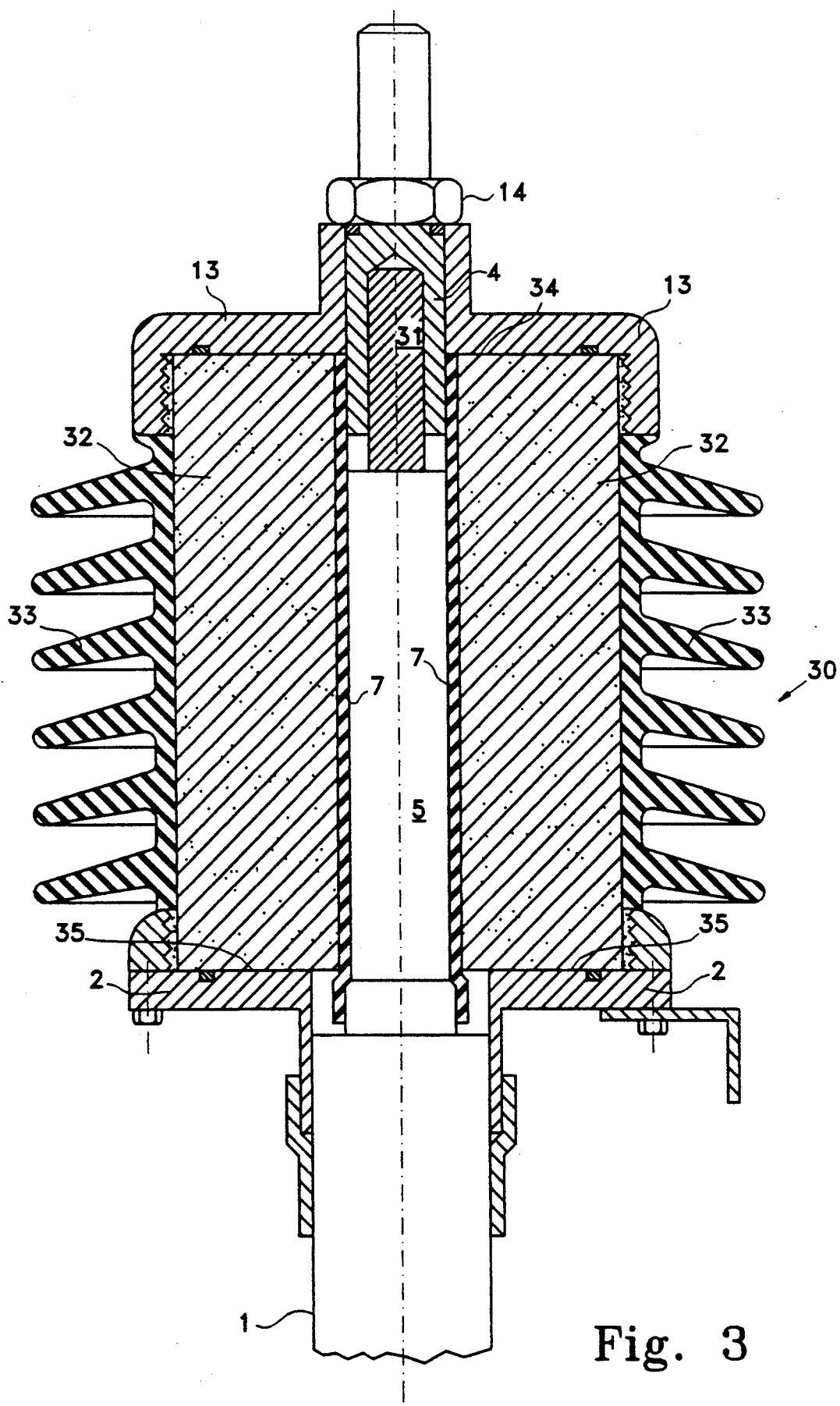
FIG. 3 illustrates a prepared end of a power cable provided with a stress relief device and a third embodiment of a surge arrestor assembly integrally formed with the insulator.

The nonlinear devices 9, 19, 32 can for instance be made of silicone carbide SiC or a metal oxide such as ZnO.

The combined voltage surge arrestor and cable termination can be preassembled and mounted at a desired position, for instance at the top of an overhead line pole or at some other suitable place, before inserting the prepared cable end through its hollow. The top element 13 may be lifted to allow filling of a compound into the cavities of the assembly and making the desired connection between the cable connector 4 and the terminal 13, or the combined surge arrestor may be prefilled and supplied with a plug-in contact, in order to optimize installation. The installation procedures, including time and expenses, of this combined unit, are very much simpler than having to install two separate units, one being the cable termination and the other being the excessive voltage arrestor.

The above detailed description of embodiments of this invention must be taken as examples only and should not be considered as limitations on the scope of protection. Nor should it be limited to cable termination technology only. For example, the same principles may be applied to and used in penetrators and transformer bushings. In those cases the nonlinear rings are arranged around the penetrating conductor as they were arranged around the cable conductor.

I claim:

1. High voltage termination for a high voltage cable operating in excess of 15 kV, said termination comprising a high voltage conductor integral with the cable and
   having an intermediate portion terminating with an exposed end, a high voltage insulating layer integral with the cable voltage conductor adjacent said exposed end and extending towards a remote end of the cable, an annular high voltage surge protector formed of one or more metal oxide sections having a nonlinear voltage characteristic, the interior of said surge protector defining a hollow extending from a first end to a second end of the surger protector for accommodating said high voltage conductor and said insulating layer extending into said hollow and with the exposed end of the conductor extending out from the second end of the surge protector, a semiconductor layer integral with the cable and surrounding said insulating layer, said semiconductor layer extending from the first end of the annular surge protector towards the remote end of the cable leaving an exposed portion of said insulating layer inside said surge protector adjacent said exposed end, a ground sheath integral with the cable and surrounding said semiconductor layer, said ground sheath extending from the first end of the annular surge protector towards the remote end of the cable and leaving an exposed portion of the semiconductor layer in the vicinity of the first end of the surge protector, high voltage connection means for effecting a first electrical connection between the second end of the annular surge protector and the exposed end of the conductor, and grounding means adjacent the first end of the annular surge protector and separated from said high voltage conductor by said high voltage insulating layer and said semiconductor layer, for effecting a second electrical connection between said first end of the annular surge protector, said semiconductor layer and said grounding sheath.

2. Termination according to claim 1, wherein said annular surge protector consists of a single sand annular section integrally formed with an outer insulator.

3. Termination according to claim 1, wherein said annular surge protector comprises at least two said annular sections inside a separate insulator.

4. Termination according to claim 3, wherein the annular surge protector is assembled within the insulator prior to connection to the conductor end.

5. Termination according to claim 1, further comprising a voltage stress relief device surrounding said intermediate portion of said insulating layer and disposed in said hollow of the annular surge protector.

6. High voltage termination for a high voltage cable operating substantially in excess of 2,4 kV, said termination comprising a high voltage conductor integral with the cable and having an intermediate portion terminating with an exposed end, a high voltage insulating layer integral with the cable and covering an intermediate portion of said high voltage conductor adjacent said exposed end and extending towards a remote end of the cable, an annular high voltage surge protector formed of one or more metal oxide sections having a nonlinear voltage characteristic, the interior of said surge protector defining a hollow extending from a first end to a second end of the surge protector for accommodating said high voltage conductor and said insulating layer, with the conductor and said insulating layer extending into said hollow and with the exposed end of the conductor extending out from the second end of the surge protector, a semiconductor layer integral with the cable and surrounding a portion of said insulating layer, said semiconductor layer extending from the first end of the annular surge protector towards the remote end of the cable leaving an exposed portion of said insulating layer inside said surge protector adjacent said exposed end, a ground sheath integral with the cable and surrounding a portion of said semiconductor layer, said ground sheath extending from the first end of the annular surge protector towards the remote end of the cable and leaving an exposed portion of the semiconductor layer in the vicinity of the first end of the surge protector, high voltage connection means for effecting a first electrical connection between the second end of the annular surge protector and the exposed end of the conductor, grounding means adjacent the first end of the annular surge protector and separated from said high voltage conductor by said high voltage insulating layer and said semiconductor layer, for effecting a second electrical connection between said first end of the annular surge protector, said semiconductor layer and said ground sheath, and a voltage stress relief device disposed in said hollow of the annular surge protector and surrounding said intermediate portion of said insulating layer, said voltage stress relief device being electrically connected between said high voltage connection means and said grounding means.

7. Termination according to claim 1, wherein the metal oxide is zinc oxide.

* * * * *

UNITED STATES PATENT AND TRADEMARK OFFICE
CERTIFICATE OF CORRECTION

PATENT NO. : 5,206,780
DATED : April 27, 1993
INVENTOR(S) : Jan Varreng

It is certified that error appears in the above-identified patent and that said Letters Patent is hereby corrected as shown below:

Col 1, line 55, delete "armour of" and insert --armour or--.

Col 2, line 1, delete "element 9 are" and add --elements 9 are--.

Col 3, line 1, after "cable", add --and covering an intermediate portion of said high--.

Col 3, line 10, after "layer", add --with the conductor and the insulating layer--.

Col 3, line 42, delete "sand" and insert --said--.

Signed and Sealed this

Twenty-seventh Day of September, 1994

Attest:

BRUCE LEHMAN

*Attesting Officer*    *Commissioner of Patents and Trademarks*